Patented Nov. 18, 1952

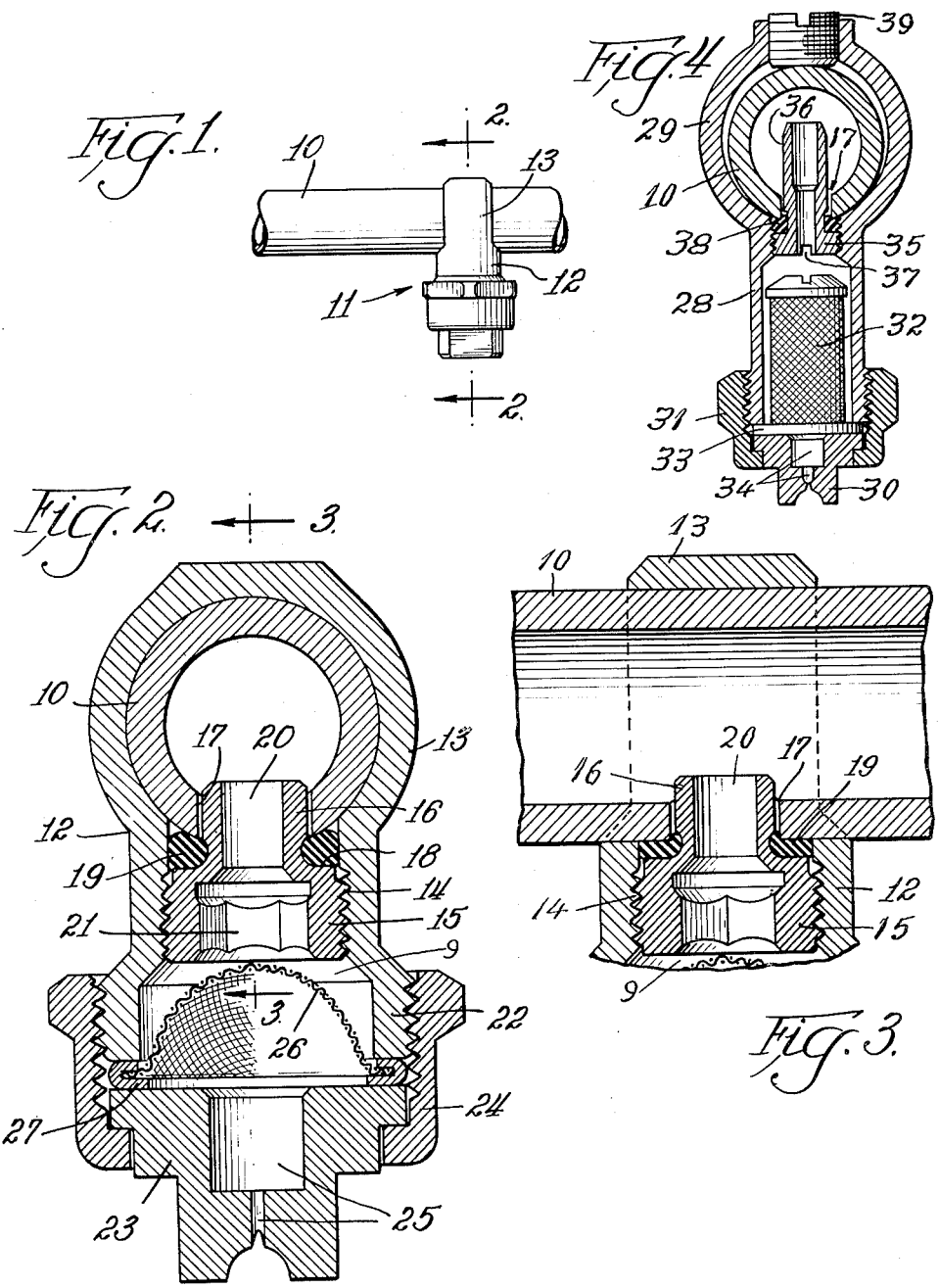

2,618,511

UNITED STATES PATENT OFFICE 2,618,511

STIRRUP NOZZLE

Fred W. Wahlin, Oak Park, Ill., assignor to Spraying Systems Co., Chicago, Ill., a corporation of Illinois Application March 18, 1949, Serial No. 82,251

4 Claims. (Cl. 299—106)

My invention relates to a stirrup nozzle for pipes and has reference more particularly to facilities for securing the nozzle onto the pipe.

Frequently it is desirable to fasten one or more spray nozzles on a length of pipe or tubing at selected places therealong in a manner to communicate fluid from the pipe to the nozzles. Preferably such nozzles should be readily and quickly attachable to plain tubing in a secure and leakproof manner without any special or difficult operation in preparation of the pipe for the attachment.

The principal objects of my invention are to provide new and improved facilities for attaching nozzles of the above mentioned type; to simplify the attachment of such nozzles; and to insure secure attachment and sealing without special precautions; these and other objects being accomplished as hereinafter pointed out and as shown in the accompanying drawing in which—

Fig. 1 is a side view of a nozzle attached to a short section of tubing in accordance with my invention;

Fig. 2 is an enlarged view on the line 2—2 of Fig. 1;

Fig. 3 is a fragmentary view of the nozzle on the line 3—3 of Fig. 2; and

Fig. 4 is a sectional view like that of Fig. 2, but showing a modified form of nozzle.

Referring to the drawing, the reference numeral 10 indicates the pipe or tubing on which the nozzle is attached, which pipe or tubing may be of any standard type, and 11 indicates the nozzle as a whole which is attached to the pipe.

This nozzle 11, as shown more particularly in Fig. 2, comprises a tubular nozzle body 12 having an opening 9 therethrough which leads outwardly from the side of the pipe 10, and said nozzle body 12 is provided at the end thereof next to the pipe with a loop or stirrup extension 13 which encircles the pipe, it being understood that said end of the nozzle body conforms to the contour of the pipe and together with the stirrup 13 provides complete encirclement therefor. The stirrup opening is made only slightly larger than the particular size of pipe on which it is to be used so that it will slip endwise on the pipe quite readily but without any considerable play. At the stirrup end thereof the nozzle body 12 is internally threaded at 14 to accommodate a threaded plug 15 which has a reduced outer end portion 16 and the pipe 10 is provided with an opening 17 through the side wall thereof to receive the reduced outer end 16 of the plug 15 as shown in Figs. 2 and 3. Between the enlarged threaded end of the plug 15 and the reduced outer end 16 thereof the plug is formed with an annular shoulder 18 to accommodate a packing ring or gasket 19 which is located in the end of the nozzle body opening 9 and clamped between the shoulder 18 of the plug 15 and the margin of the opening 17 of the pipe so as to seal said opening 17. Because of the curvature of the surface of the pipe 10 this gasket 19 is relatively thick so that when clamped against the curved surface of the pipe it will compress sufficiently at the sides of the opening 17 as shown in Fig. 2 as well as at the sides of said opening as shown in Fig. 3 and insure thorough sealing entirely around said opening.

The plug 15 has an opening 20 therethrough to afford communication from the interior of the pipe 10 to the interior of the nozzle body 12 and the outer end of this opening within the threaded portion of the plug is enlarged and of hexagonal form as indicated at 21 to accommodate a hex rod wrench therein.

Wrench access is had to the plug 15 through the outer end of the opening 9 which is normally closed by an orifice plug or nozzle tip 23 which has a spray orifice 25 extending therethrough and is detachably secured to the outer end of the body 12 in any convenient manner, as for example, by an internally threaded shell or gland nut 24 which engages external threads on the outer end of the nozzle body, as shown.

Preferably the outer end of the nozzle body 12 is enlarged, as indicated at 22 and the outer end of the opening 9 accordingly enlarged, as shown, to accommodate concavo-convex strainer 26 having a marginal sealing gasket 27 which is clamped between the plug or tip 23 and the outer end of the nozzle body as shown in Fig. 2.

With the above construction the nozzle may be attached to a pipe at any selected place therealong by merely drilling an opening 17 through the side wall of the pipe and removing the burrs from the outer end of the opening. Then the nozzle end closure 23 and 24 and strainer 26 having been removed and the plug 15 having been retracted sufficiently, or completely withdrawn, the pipe 10 is slipped through the stirrup 13 until the drilled opening 17 thereof is opposite the threaded opening 14 of the nozzle body. Then the plug 15 with sealing ring or gasket 19 thereon is inserted in the threaded opening 14 and turned down with a wrench inserted in the wrench opening 21 until the gasket 19 is firmly compressed all the way around against the margin of the tube opening 17, and as the reduced end 16 is then engaged in said tube opening the nozzle is secured firmly in place on the pipe.

After the nozzle body has thus been secured in place on the pipe the strainer and cap 23, 24 are secured in place and the nozzle is then ready for use.

In the modified form of nozzle which is shown in Fig. 4, the nozzle body 28 thereof is also tubular and has a stirrup 29 at one end which encircles the pipe 10, and an end closure at the other end consisting of an orificed plug or tip 30 (like the plug or tip 23 of Fig. 2) which is likewise secured on the nozzle body 28 by an internally threaded coupling nut 31 which engages the externally threaded outer end of the body 28.

The nozzle body 28 is elongated to receive a cylindrical screen assembly 32 which has an annular flange 33 at the outer end which is clamped by the coupling nut 31 between the nozzle tip 30 and the outer end of the body 28. This screen assembly may be of any desired construction, as for example, such as shown in my application Serial No. 81,288, filed March 14, 1949, whereby the liquid is caused to pass through the cylindrical screen thereof in flowing from the interior of the nozzle body 28 to the orifice 34 of the nozzle tip.

At its end next to the pipe 10, the nozzle body 28 is internally threaded, as shown, for threaded engagement therewith of the outer enlarged and externally threaded end 35 of a nipple 36 which projects through the pipe hole 17 for securing the nozzle in place thereon.

This nipple is provided with a screw driver notch 37 at the enlarged end 35 for turning it in place and has a thick gasket 38 under the enlarged end 35 for sealing engagement with the pipe 10 around the hole 17.

These nozzles of the present invention are usually arranged to discharge downwardly from the pipe 10 as shown in the drawing, and the nipple 36 is of sufficient length to project a substantial distance upwardly in the interior of the pipe 10 so that any sediment in the pipe will deposit below the upper end of the nipple 36 and thus will not be communicated through the nipple 36 to the nozzle.

The pipes 10 on which nozzles of the above described types are mounted are not always of exact size and to accommodate inaccuracies of size, the opening through the stirrup 29 is made sufficiently large to freely receive oversize pipes of the particular pipe size for which the nozzle is intended. Such enlargement of the opening also permits the nozzle to be more readily applied on the pipe.

To compensate for the enlargement of the stirrup opening, the stirrup 29 is provided, at the side thereof opposite the nozzle 28, with a threaded opening therethrough for a set screw 39, preferably of screw driver type, by which the pipe 10 may be clamped against the opposite side of the stirrup opening, as shown, for effective sealing engagement of the gasket 38 thereagainst.

As in the nozzle construction of Figs. 1, 2 and 3, the nozzle end closure 30 and 31 and the strainer assembly 32 are removed in applying the nozzle of Fig. 4 on the pipe 10. The nipple 36 and its gasket 38 are also removed and the set screw 39 retracted so that it does not project in the stirrup opening.

The nozzle 28 is then slid onto the pipe 10 to a position in which the opening at the inner end of the body 28 registers with the pipe opening 17, in which position the nipple 36 is inserted but only sufficiently to prevent movement of the nozzle from this position. Then the set screw 39 is adjusted until the pipe 10 is held thereby against the opposite side of the stirrup opening, after which the nipple 36 is turned down sufficiently to compress the gasket 38 tightly around the outer end of the pipe opening 17 and thereby seal the opening and lock the nozzle securely in place on the pipe 10. Thereafter the strainer assembly 32 and nozzle tip 30 are placed in position and secured in place by the coupling nut 31.

While I have shown and described my invention in a preferred form, I am aware that various changes and modifications may be made therein without departing from the principles of my invention, the scope of which is to be determined by the appended claims.

I claim as my invention:

1. A spray nozzle assembly detachably securable on the side of a round pipe having a nozzle supply hole through its side wall, said assembly comprising a holder with an opening therethrough, a spray tip member through which the nozzle spray is discharged outward at one end of said opening, and a pipe insert member which is encircled by a gasket of compressible sealing material and has one end thereof projecting part way into said opening at the other end thereof and has a pipe insert portion extending outwardly through the latter end of said opening and terminating therebeyond, both of said members being supported by the holder and each having a passageway therethrough substantially concentric with the opening and leading respectively into the interior of the assembly and intercommunicating therein with one another, said holder being provided with a pipe receiver in which the pipe is detachably securable and a part, at least, of which constitutes a seat of concave cross section extending crosswise of the opening at the pipe insert member end thereof and facing outwardly therefrom to accommodate the pipe sidewise therein in a position in which the outwardly extending pipe insert portion of the pipe insert member projects through the nozzle supply hole of the pipe and the gasket thereon is held in the end of the opening, said pipe insert portion of the pipe insert member having therearound within the opening an annular gasket seat extending substantially radially outwardly to the surrounding wall of the opening and which provides within the end of said opening an annular cavity which has an outer margin conforming to the rounded cross section of the pipe and within which cavity the gasket is compressible against the wall of the pipe in the pipe receiver seat, said assembly having threaded means by which relative adjustment is effected of said gasket seat and the pipe in said pipe receiver seat for compressing the gasket therebetween in said cavity.

2. A spray nozzle assembly detachably securable on the side of a round pipe which has a nozzle supply hole through its side wall, said assembly comprising a holder with an opening therethrough which is internally threaded at one end, a pipe insert member which has one end thereof projecting into the internally threaded end of said opening and provided therein with an enlargement which has a surrounding margin and has the pipe insert portion of the pipe insert member inset centrally from said surrounding margin thereof and extending outwardly through said internally threaded end of said opening and terminating therebeyond, and provided with an annular gasket of compressible material thereon, a spray tip member which is removably secured to said holder and closes the other end of said opening, each of said members having a passageway therethrough substantially concentric with the opening and leading respectively into the opening to a place of inter-communication with one another between said members, said holder being provided with a pipe receiver in which the pipe is securable and a part, at least, of which constitutes a seat of concave cross section extending crosswise of the opening at the threaded end thereof and facing outwardly therefrom to accommodate the pipe sidewise therein with the pipe insert portion of the pipe insert member projecting into the pipe through the nozzle supply hole thereof and the gasket thereon held in the end of the opening, said pipe insert portion having at its inner end an annular gasket seat therearound which is within the threaded end of the holder opening and extends outwardly from the inner end of the pipe insert portion to the surrounding wall of said opening and provides within the threaded end of said opening an annular gasket cavity the surrounding outer margin of which conforms to the contour of the pipe and within which cavity the gasket is receivable and compressible against the wall of the pipe in the pipe receiver seat, said enlargement of the pipe insert member being provided with external threads engaged with the aforesaid internal threads of the holder opening to provide adjustment of said pipe insert member toward the pipe in the pipe receiver seat to compress the gasket between said gasket seat and the pipe and in said cavity.

3. The combination of a spray nozzle assembly having a holder which has an opening therethrough and is provided with a pipe receiver, a part at least of which constitutes an outwardly facing seat of concave cross section extending crosswise of said opening at one end thereof, a round pipe detachably secured in said seat and having a nozzle supply hole through the side wall thereof at the end of and substantially in line with the opening of the holder, a pipe insert member one end of which projects part way into said end of the opening and has the pipe insert portion thereof extending outwardly through said opening and terminating at a distance therefrom and projecting through said nozzle supply hole in the side wall of the pipe, said insert portion having a gasket of compressible sealing material therearound at the inner end thereof, and a spray tip member which discharges outwardly at the other end of said opening, both of said members being supported by the holder and each having a passageway therethrough substantially concentric with the opening and leading respectively into the interior of the spray nozzle assembly and intercommunicating therein with one another, the portion of said holder around that end of the opening from which the pipe insert portion of the pipe insert member projects being of a contour corresponding to the rounded cross section of the pipe to provide said opening with a correspondingly contoured margin at that end, and said pipe insert portion having an annular gasket seat therearound within the holder opening and extending substantially radially outward to the surrounding wall of said opening and located at such distance from said contoured end of the opening to provide in said end of the opening a contoured gasket cavity of varying depth in which the gasket is compressed between the pipe and gasket seat to elevationally contoured pipe fitting shape.

4. The combination with a round pipe, of a spray nozzle assembly comprising a barrel formed at one end thereof with a pipe receiver a part at least of which constitutes an outwardly facing concave seat which conforms to the external contour of the pipe and has the pipe secured sidewise therein, said barrel having an opening which extends therethrough from end to end and has one end thereof internally threaded and opening into the bottom of said seat and marginally contoured to correspond to the rounded cross section of the pipe in the seat, a centrally apertured gasket of compressible sealing material in said marginally contoured threaded end of the opening, a pipe insert member one end of which projects part way into the internally threaded end of said opening and has threaded engagement with the internal threads of said opening and has the pipe insert portion of the pipe insert member inset centrally from the margin thereof and extending therefrom outwardly through the central aperture of the gasket and through the internally threaded end of the opening and through a hole in the side of the pipe and terminating at a distance from the internally threaded end of the opening, and of substantially cylindrical form, said pipe insert member being remote from and operatively accessible through the opposite end of said opening to compress the gasket in the opening and against the pipe, and a spray tip member which is spaced from said pipe insert member and removably secured to the holder and closes said opposite end of the opening and through which spray is discharged from the nozzle assembly, each of said members having a passageway therethrough substantially concentric with said holder opening and leading respectively into the portion of said opening between said members, and a screen in said opening and interposed between said members.

FRED W. WAHLIN.

REFERENCES CITED

The following references are of record in the file of this patent:

UNITED STATES PATENTS

| Number | Name | Date |
| --- | --- | --- |
| 1,545,493 | Hoffman | July 14, 1925 |
| 1,630,974 | Shelor et al. | May 31, 1927 |
| 1,652,599 | Ayers | Dec. 13, 1927 |
| 2,055,864 | Harsch | Sept. 29, 1936 |
| 2,239,651 | McMurray et al. | Apr. 22, 1941 |
| 2,242,680 | Schacht | May 20, 1941 |
| 2,332,350 | Scritchfield | Oct. 19, 1943 |
| 2,344,163 | Misch | Mar. 14, 1944 |
| 2,512,009 | Baber | June 20, 1950 |